United States Patent
Liang et al.

(10) Patent No.: US 9,713,024 B2
(45) Date of Patent: Jul. 18, 2017

(54) MEASUREMENT CONFIGURATION AND REPORTING METHOD FOR MULTI-CARRIER SYSTEM AND DEVICE THEREOF

(71) Applicant: CHINA ACADEMY OF TELECOMMUNICATIONS TECHNOLOGY, Beijing (CN)

(72) Inventors: Jing Liang, Beijing (CN); Haitao Li, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 0 days.

(21) Appl. No.: 13/691,743

(22) Filed: Dec. 1, 2012

(65) Prior Publication Data

US 2013/0163454 A1 Jun. 27, 2013

Related U.S. Application Data

(63) Continuation of application No. PCT/CN2011/073946, filed on May 11, 2011.

(30) Foreign Application Priority Data

Jun. 18, 2010 (CN) .......................... 201010209864.6

(51) Int. Cl.
  *H04W 24/10* (2009.01)
  *H04W 36/00* (2009.01)
(52) U.S. Cl.
  CPC ....... *H04W 24/10* (2013.01); *H04W 36/0055* (2013.01); *H04W 36/0083* (2013.01)
(58) Field of Classification Search
  CPC ............. H04W 24/10; H04W 36/0083; H04W 36/0055

(Continued)

(56) References Cited

U.S. PATENT DOCUMENTS 8,358,594 B2 * 1/2013 Lee et al. ....................... 370/254
2009/0316659 A1 * 12/2009 Lindoff et al. ................. 370/332
(Continued)

FOREIGN PATENT DOCUMENTS

CN 101155376 4/2008
CN 101534518 9/2009
(Continued)

OTHER PUBLICATIONS

Huawei: Horizontal and Vertical Mobility, 3GPP Draft; R2-102022 Horizontal and Vertical Mobility, 3rd Generation Partnership Project (3GPP), Mobile Competence Centre 650, Route Des Lucioles F-06921 Sophia-Antipolis Cedex France, vol. RAN WG2, no. Beijing, china; Apr. 12, 2010, Apr. 3, 2010 (Apr. 3, 2010), XP050422319; pp. 1-2.

(Continued)

*Primary Examiner* — Jianye Wu
(74) *Attorney, Agent, or Firm* — Ladas & Parry, LLP

(57) ABSTRACT

The present invention discloses a measurement configuration and reporting method for multi-carrier system and device thereof, and the method comprises the following steps: eNB sends RRC signaling carrying multi-carrier measurement configuration information to the terminal; said terminal measures according to said multi-carrier measurement configuration information and carries multi-carrier measurement results in measurement report message. In the embodiments of the present invention, the terminal carries multi-carrier measurement results in measurement report message according to RRC signaling sent by eNB to quickly provide measurement results required during eNB handover, thus facilitating source eNB to perform multi-carrier handover for UE under CA.

16 Claims, 3 Drawing Sheets

(58) Field of Classification Search
USPC .................................. 370/252, 332; 455/59
See application file for complete search history.

(56) References Cited

U.S. PATENT DOCUMENTS

| | | | | |
|---|---|---|---|---|
| 2010/0273520 | A1* | 10/2010 | Pelletier et al. ............. | 455/522 |
| 2011/0090817 | A1* | 4/2011 | Qu et al. ...................... | 370/254 |
| 2011/0317652 | A1* | 12/2011 | Kim et al. .................... | 370/329 |
| 2012/0034919 | A1* | 2/2012 | Nakata et al. ................ | 455/436 |
| 2012/0082137 | A1* | 4/2012 | Ito ................................ | 370/331 |
| 2012/0113941 | A1* | 5/2012 | Chung et al. ................ | 370/329 |
| 2013/0010619 | A1* | 1/2013 | Fong et al. ................... | 370/252 |
| 2013/0044662 | A1* | 2/2013 | Kwon et al. .................. | 370/311 |

FOREIGN PATENT DOCUMENTS

| | | |
|---|---|---|
| CN | 101547467 | 9/2009 |
| CN | 101605352 | 12/2009 |
| CN | 101656980 | 2/2010 |
| CN | 101674586 | 3/2010 |
| EP | 1903692 | 3/2008 |

OTHER PUBLICATIONS

E-UTRA RRC support of CA measurements, 3GPP Draft; R2-103119 on CA Measurements Including Stage 3, 3rd Generation Partnership Project (3GPP), Mobile Competence Centre 650, Route Des Lucioles F-06921 Sophia-Antipolis Cedex; France, vol. RAN WG2, no. Montreal, Canada; May 10, 2010, May 4, 2010 (May 4, 2010), XP050423262; pp. 1-21.

ZTE: "Measurement modeling in CA", 3GPP Draft; R2-096766 Measurement Modeling in CA, 3rd Generation Partnership Project (3GPP), Mobile Competence Centre 650, Route Des Lucioles F-06921 Sophia-Antipolis Cedex; France, no. Jeju; Nov. 9, 2009, Nov. 9, 2009 (Nov. 9, 2009), XP050391232 pp. 1-5.

LG Electronics 1 NC: "Secondary carrier intra-/ inter-frequency measurement procedure", 3GPP Draft; R2-096024 Secondary Carrier Intra-Inter-Frequency Measurement Procedure, 3rd Generation Partnership Project (3GPP), Mobile Competence Centre; 650, Route Des Lucioles F-06921 Sophia-Antipolis Cedex; France, no. Miyazaki; Oct. 12, 2009, Aug. 12, 2009 (Aug. 12, 2009), XP050390442 pp. 1-2.

Nokia Corporation et al: "Configuration of SCell based measurement events", 3GPP Draft; R2-103506 Configuration of SCell Based Measurement Events, $3^{rd}$ Generation Partnership Project (3GPP), Mobile Competence Centre 650, Route Des Lucioles F-06921 Sophia-Antipolis Cedex; France, vol. RAN WG2, no. Stockholm, Sweden; Jun. 28, 2010, Jun. 22, 2010 (Jun. 22, 2010), XP050451094. pp. 1-8.

Extended European Search Report with EPO Supplementary European Search Report for EP11795057.6 dated Jun. 27, 2016.

Decision of Reexamination dated Mar. 3, 2016 from corresponding CN 201010209864.6 and its English translation.

Office action dated Jan. 5, 2013 from corresponding CN Patent Application No. 201010209864.6 and its English translation.

Office action dated Jun. 5, 2013 from corresponding CN Patent Application No. 201010209864.6 and its English translation.

Decision of Rejection dated Aug. 2, 2013 from corresponding CN Patent Application No. 201010209864.6 and its English translation.

ISR/WO from corresponding PCT/CN2011/073946 dated Aug. 18, 2011 and its English translation.

3GPP TS 25.331 V8.11.0: Radio Resource Control (RRC): Protocol specification (Release 8) Jun. 17, 2010, Section 8.4.

\* cited by examiner

MEASUREMENT CONFIGURATION AND REPORTING METHOD FOR MULTI-CARRIER SYSTEM AND DEVICE THEREOF

CROSS REFERENCE TO RELATED APPLICATIONS

This application is a continuation of PCT/CN2011/073946 filed on May 11, 2011, which claims priority to Chinese Patent Application No. 201010209864.6 filed in the Patent Office of the People's Republic of China on Jun. 18, 2010, entitled "Measurement Configuration and Reporting Method for Multi-Carrier System and Device Thereof" the disclosures of which are hereby incorporated by reference in their entireties.

FIELD OF THE INVENTION

The embodiments of the present invention relate to the field of communication technology, in particular to the measurement configuration and reporting method for multi-carrier system and device thereof.

BACKGROUND OF THE INVENTION

In LTE (Long Term Evolution) system and the previous wireless communication system, there is one carrier in a cell. The maximum bandwidth in LTE system is 20 MHz, as shown in FIG. 1. For LTE system is a signal-carrier system, when making handover decision, source eNB only provides target eNB with the information of one cell for target-side eNB to make admitting decision.

In LTE-A (LTE Advanced) system, the peak rate is greatly improved compared with LTE, which is required to be 1 Gbp at downlink and 500 Mbps at uplink. Only using the carrier with maximum bandwidth of 20 MHz can hardly achieve the requirements of peak rate. Therefore, LTE-A system needs to expand the bandwidth available to terminal, thus the introduction of CA (Carrier Aggregation) technology, that is, aggregate several continuous or discontinuous carriers under the same eNB (evolved Node-B) and serve UE (User Equipment), so as to provide the required rate; thus these aggregated carriers are also called CC (Component Carrier). Each cell can be a cell, and those cells (CCs) under different eNB cannot be aggregated. To ensure UE of LTE can be work under each aggregated carrier, each carrier cannot exceed 20 MHz at most. CA technology of LTE-A is shown in FIG. 2, where there are 4 carriers that can be aggregated under the eNB of LTE-A shown, and the eNB can perform data transmission on 4 carriers and UE simultaneously, to improve system throughput.

Handover of LTE system can be divided into two categories from the perspective of the quantity of participating nodes, that is, intra-eNB handover and inter-eNB handover. Therein, intra-eNB handover can be the handover performed for updating key parameters for security reasons. As to inter-eNB handover, in view of the type of interface between source eNB and target eNB, it can be classified into X2 handover and S1 handover, to transmit message respectively through X2 interface and S1 interface, so message of S1 handover will pass through MME node. And for UE of LTE system works under single carrier, the handover is that between signal-carrier cells.

In LTE-A system, UE can simultaneously aggregate to perform signaling scheduling and service transmission in multiple carriers. When UE uses CA, each aggregated component carrier refers to a cell. To differentiate such cells, the concept of primary cell (Pcell) and secondary cell (Scell) are introduced. Pcell has the following characteristics: PUCCH (Physical Uplink Control Channel) only exists on Pcell; in case of radio link failure of Pcell, UE triggers RRC (Radio Resource Control) to connect re-establishment; system information acquisition and updating of Pcell are the same as LTE process; NAS information is acquired through Pcell; random access is performed only on Pcell. UE has only one Pcell but one or more Scell (s). The frequency/carrier of Pcell are called PCC (Primary Component Carrier) and correspondingly that of Scell is called SCC (Secondary Component Carrier). For carrier aggregation characteristics are introduced into LTE-A system, UE can simultaneously aggregate to perform signaling scheduling and service transmission in multiple carriers, which requires source eNB to provide more information to target eNB in the process of multi-carrier handover.

In current technology, UE only can provide measurement result of one or several cells at one frequency in each measurement report. As to UE in CA state, if source eNB intends to trigger multi-carrier handover, it needs to wait for measurement report results many a time, which will increase the total measurement report delay, cause deferring of handover decision or UE losing connection and further induce call drop; if source eNB directly decides handover without waiting for repeated measurement result report, it will be unable to provide appropriate candidate cell list to target eNB, thus making target eNB blindly select target cell when having no idea of channel quality and further increasing the probability of handover failure.

SUMMARY OF THE INVENTION

The embodiments of the present invention provide the measurement configuration and reporting method for multi-carrier system and device thereof, for the purpose of carrying the results of multi-carrier measurement through measurement report message in multi-carrier system.

The embodiments of the present invention provide the measurement configuration and reporting method for multi-carrier system, including:

eNB sends radio resource control (RRC) signaling that carries multi-carrier measurement configuration information to terminal;

Said terminal measures in accordance with said multi-carrier measurement configuration information, and carry the results of multi-carrier measurement in measurement report message.

The embodiments of the present invention provide a kind of eNB, including:

Sending unit, which is used to send RRC signaling that carries multi-carrier measurement configuration information;

Reception unit, which is used to receive measurement report message that carries multi-carrier measurement results.

The embodiments of the present invention provide a kind of terminal, including:

Reception unit, which is used to receive RRC signaling sent by eNB;

Measuring unit, which is used to perform measurement according to the measurement configuration information;

Reporting unit, which is used to carry multi-carrier measurement results in measurement report message.

Compared with the present technology, the embodiments of the present invention at least possess the following advantages:

In the embodiments of the present invention, terminal carries multi-carrier measurement results in measurement report message based on RRC signaling sent by eNB and rapidly provides eNB with measurement results required by handover, to enable eNB to quickly perform multi-carrier handover for UE in CA state.

BRIEF DESCRIPTION OF THE DRAWINGS

To more clearly explain the technical proposal in the embodiments of the present invention or present technology, attached drawings required in the embodiments of the present invention or present technology description shall be simply introduced below. Obviously, drawings described below are only some embodiments of the present invention, and for ordinary technicians of this field, they can also acquire other attached drawings based on these drawings on the premise of paying no creative work.

DETAILED DESCRIPTION OF THE EMBODIMENTS OF THE INVENTION

Figure 1:
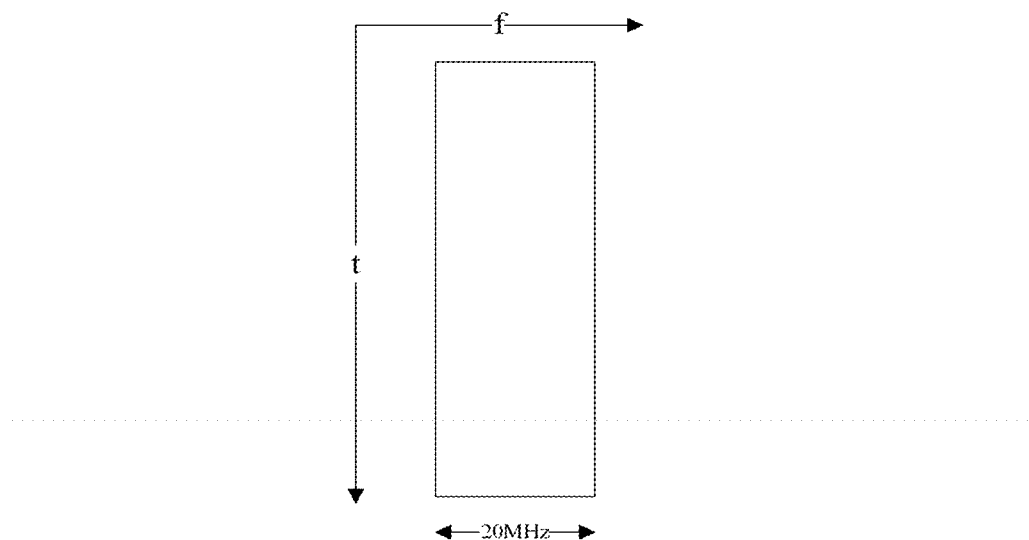
FIG. 1 is a structure diagram of the maximum bandwidth in LTE system of present technology.
Figure 2:
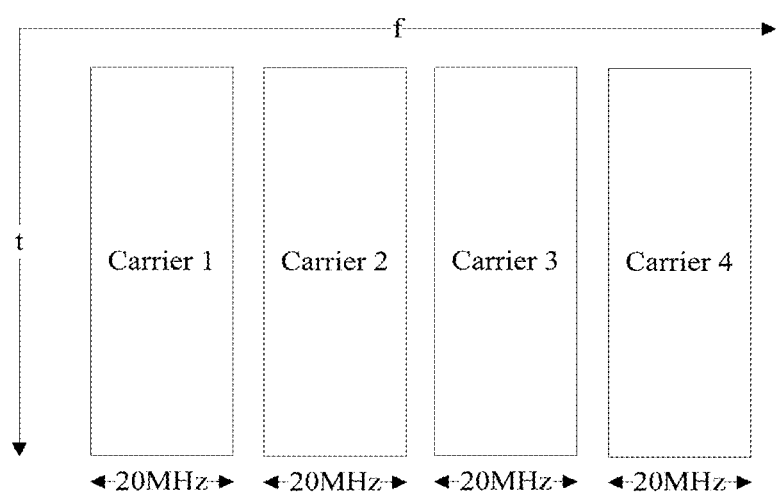
FIG. 2 is a structure diagram of CA technology of LTE-A in present technology.

To clearly explain the measurement configuration and reporting method for multi-carrier system and device thereof provided by the embodiments of the present invention, measurement mechanism in LTE system and handover mechanism in LTE-A system are described below firstly.

In LTE system, eNB sends measurement and configuration information to UE through RRC (Radio Resource Control) signaling (RRC re-configuration message). Then UE performs measurement (common frequency, pilot frequency and inter-rat) according to the contents of such information and reports measurement results to network.

Organizational structure of measurement and configuration information sent by eNB is as follows:

Measurement object: With frequency as the basic unit, each measurement object configured, as an independent frequency, has independent ID, which can involve carrier frequency, black and white list of neighbor cell, the cell to be reported to CGI (cell global identifier), etc.

Report configuration: It is divided into event-triggered reporting and periodically-triggered reporting according to trigger type, which has an independent ID. The former will be configured to the threshold value of a certain event and TimeToTrigger meeting trigger condition, while the latter will be configured to periodically-triggered purpose (for example, reporting CGI). Report configuration also includes the amount of trigger & report measurement, reporting interval & frequency, and other information.

Measurement ID: An independent ID, which can be connected with a measurement object and report configuration at the same time. If the threshold for starting measurement is met, UE will judge whether to perform such measurement according to measurement ID.

Other parameters may include: measurement configuration, measure open threshold, speed state parameter and others.

Three trigger methods for UE to send measurement and reporting to eNB according to measurement and configuration information: event-triggered reporting, periodic reporting and event-triggered periodic reporting, which are differentiated according to all parameter combinations in report configuration. For example, when report configuration is event-triggered and configured to the threshold value of a certain event, TimeToTrigger meeting trigger condition and other relevant parameters, UE will report in once event-triggered manner without configuring measurement interval or reporting frequency and other parameters.

Main content of measurement report message sent by UE comprises:

Each measurement report message can only report the content corresponding to one measurement ID, namely the cell meeting relevant report configuration with one frequency, which includes: measurement ID, measurement amounts in this cell (RSRP and RSRQ), cell ID in physical layer of qualified neighbor cell, whether to report measurement amount of each neighbor cell and CGI depends on whether the network configures UE to report such information; herein, RSRP refers to Reference Signal Received Power, and RSRQ refers to Reference Signal Received Quality, which are both measurement amount.

Measurement report process involves:

For each measurement ID, there are two processes: measurement & assessment and reporting organization:

a) Measurement & assessment: UE finds out the cell meeting report configuration in a certain measurement object through measurement for assessment. A cell meeting access condition within TimeToTrigger will be included in report list. Reporting process will be triggered once a new cell is brought into the list.

b) Reporting organization: namely the process for filling in reporting message, including measurement ID, measurement information of this cell and neighbor cell. The process for acquiring measurement information of neighbor cell is listed below: perform quality sequencing for the cell included in report list of a) according to the amount of report measurement specified in configuration and then fill in measurement report message according to the sequence from high to low.

The number of neighbor cell included in report list is determined by several conditions below:

a) Condition for access to report list: when measurement amount of a certain cell meets access standard (for example, signal quality of this cell exceeds a certain threshold value);

b) Condition for excluding from report list: when measurement amount of a certain cell meets excluding standard (for example, signal quality of this cell is less than a certain threshold value);

c) Condition for a cell to be included in report list: when a certain cell meets the condition for access to report list within TimeToTrigger, it will be brought into the list.

d) Condition for a cell to be deleted in report list: when a certain cell meets the condition for excluding from report list within TimeToTrigger, it will be deleted from the list.

During reporting, UE will report all neighbor cells still in report list to the network without considering whether these cells have been reported during previous reporting.

The relevant concepts of LTE-A multi-carrier are introduced below:

When CA is adopted by UE, each aggregated component carrier can be a cell. To differentiate these cells, the concepts of primary cell (Pcell) and secondary cell (Scell) are introduced. Pcell has the following characteristics:

1) PUCCH is only on Pcell;
2) When radio link fails in Pcell, UE will trigger RRC to connect with reestablishment process;
3) The acquisition and updating for system information of Pcell is the same as that of LTE;
4) NAS information is acquired through Pcell;
5) Random access is only conducted on Pcell.

UE has only one Pcell and one or more Scells. Frequency/carrier for Pcell is called PCC (primary component carrier), while that for Scell is called SCC (secondary component carrier).

To better support movable management of UE under CA, LTE-A introduces A3-Pcell, A5-Pcell and B2-Pcell events aiming at Pcell. The difference between the three events and A3, A5 and B2 events of LTE is listed below: Pcell is regarded as the service cell for reference of measurement comparison.

To better support carrier/cell management of UE under CA, LTE-A introduces common frequency A3-Scell event aiming at Scell. The difference between this event and A3 event of LTE is as follows: Scell is regarded as the service cell for reference of measurement comparison and only measurement result of common frequency is compared. In addition, A1 and A2 events can be configured on Scell. The name of LTE-A event is not determined yet at present. Therefore, A1 and A2 events configured on Scell as well as A3-Scell event of common frequency can also be called C1, C2 and C3 events, to differentiate from A1, A2 and A3-Pcell configured on Pcell.

LTE-A allows multi-carrier handover. Thus, the handover procedure of LTE-A is different from that of LTE, including:

1) Source eNB in handover preparation stage selects a target Pcell and put it into handover request message of the interface to inform target eNB. Besides, such message can carry candidate cell list containing multiple Scells;
2) After receiving handover request message sent by source eNB, target eNB can re-select Pcell and select target Scell through handover according to candidate Scell list;
3) Target eNB brings target Pcell and Scell selected by itself into handover command, and passes down to UE through source eNB;
4) After receiving handover command, UE performs multi-carrier handover according to Pcell and Scell information.

Then we will combine the attached drawings in the embodiments of the present invention to clearly and completely describe the technical proposals therein. Obviously, the embodiments described below are only a part of them instead of the whole. Based on the embodiments of the present invention, other embodiments acquired by ordinary technicians of this field on the premise of paying no creative work all belong to the protected scope of the embodiments of the present invention.

Embodiment I

Figure 3:
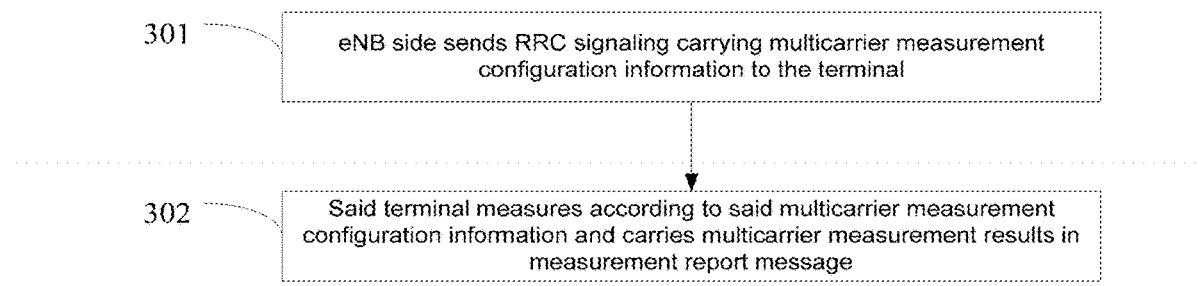
FIG. 3 is a flow diagram of measurement configuration and reporting method for multi-carrier system provided in the embodiment I of the present invention.

Embodiment 1 of the present invention provides one measurement configuration and reporting method for multi-carrier system as shown in FIG. 3, comprising:

Step 301: eNB sends RRC (radio resource control) signaling carrying the information on multi-carrier measurement configuration to the terminal;

Step 302: Said terminal measures according to said information on multi-carrier measurement configuration and carries multi-carrier measurement results in measurement report message.

Said RRC signaling carries reporting indicator;

Said terminal shall measure in accordance with said multi-carrier measurement configuration information and carry multi-carrier measurement results in measurement report message, including: said terminal shall acquire the reporting indicator carried by said RRC signaling, determine the measurement report identification information corresponding to reported multi-carrier measurement results based on said reporting indicator and then carry multi-carrier measurement results in measurement report message corresponding to said measurement report identification information.

Multi-carrier measurement results carried in measurement report message corresponding to said measurement report identification information include:

When said measurement report identification refers to measurement identification ID, said terminal will carry multi-carrier measurement results in measurement report message corresponding to said measurement ID;

When said measurement report identification information refers to measurement event, said terminal will carry multi-carrier measurement results in measurement report message corresponding to said measurement event;

When said measurement report identification information refers to measurement object, said terminal will carry multi-carrier measurement results in measurement report message corresponding to said measurement object.

Meanwhile, said reporting indicator also carries the identifications of each carrier measurement results corresponding to said multi-carrier measurement results.

Said multi-carrier measurement results carried in measurement report message involve:

Said terminal shall determine the measurement report identification information corresponding to the reported multi-carrier measurement results according to the pre-configured report strategy, and carry multi-carrier measurement results in measurement report message corresponding to said measurement report identification information.

Said multi-carrier measurement results include one or some of the following options:

The strongest cell on other measurement frequencies or the cells of configuration numbers from strong to weak in accordance with channel quality;

The strongest cell on other measurement frequencies in report list or the cells of configuration numbers from strong to weak in accordance with channel quality;

Those cells in the report list corresponding to other measurement identifications currently;

Measurement results corresponding to cells of configured measurement events, measurement objects, measurement identification, serving cells or measurement white list;

Cells with channel quality greater than preset threshold;

Cells capable of CA with those of currently triggered measurement report.

Said multi-carrier measurement results include one or some of the following options:

Measurement identification corresponding to additional measurement results;

Identifications of measurement report cells in additional measurement results;

Channel quality of measurement report cells in additional measurement results, wherein the channel quality includes RSRP and/or RSRQ.

Said multi-carrier measurement results carried in measurement report message involve:

Said terminal carries multi-carrier measurement results in measurement report information according to one or some of the following configured options: the maximum allowable cell number to be reported, the minimum threshold to be satisfied by allowable reported cell, the maximum allowable frequency to be reported, and the maximum allowable cell number to be reported by each frequency.

Embodiment II

Figure 4:
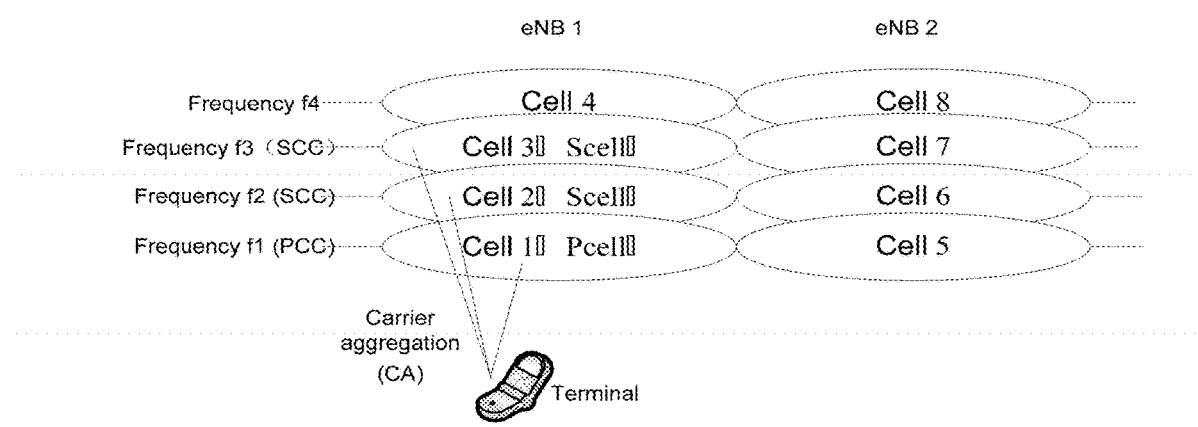
FIG. 4 is a schematic diagram of application context of measurement configuration and reporting method for multi-carrier system provided in the embodiment II of the present invention.

Embodiment II of the present invention provides the measurement configuration and reporting method for multi-carrier system, whose application condition is shown in FIG. 4. UE runs under eNB 1 and aggregates cell 1, 2 and 3. The frequency f1 for cell 1 is PCC and cell 1 refers to Pcell. The frequency f2 and f3 for cell 2 and 3 are SCC and the two cells refer to Scell. Cell 5 refers to neighbor cell on f1, cell 6 refers to neighbor cell on f2, cell 7 refers to neighbor cell on f3, and cell 4 & 8 refer to neighbor cell on f4.

In the embodiments of the present invention, to conduct moveable management and/or carrier management, eNB 1 uses RRC to connect re-configuration message to measure and configure the terminal. To report additional measurement results, when eNB 1 configures Pcell-related measurement such as A3-Pcell (A3), it also configures additional measurement results (excluding the cell on frequency triggering this reporting) carried during A3-Pcell (A3) reporting, which include one or some of the following options:

The strongest cell on other measurement frequencies or several cells with better channel quality (namely the cells of configuration numbers from strong to weak in accordance with channel quality);

The strongest cell still in report list on other measurement frequencies or several cells with better channel quality (namely the cells of configuration numbers from strong to weak in accordance with channel quality);

Those cells in the report list corresponding to other measurement identifications currently;

Measurement results corresponding to cells of configured measurement events, measurement objects, measurement identification, serving cells or measurement white list;

Cells with channel quality greater than preset threshold;

The cell meeting a certain condition (for example, the cell meeting access condition rather than TimeToTrigger; the cell with signal quality exceeding a certain preset threshold); for example, measurement target cell corresponding to A3-Scell (A) event or the cell with signal quality exceeding a certain threshold and configured for UE to report the quality. This measurement configuration can be identified through measurement id, event or object;

The cell which can perform carrier aggregation with the triggered and reported cell.

Said multi-carrier measurement results include one or some of the following options:

Measurement identification corresponding to additional measurement results;

Identifications of measurement report cells in additional measurement results;

Channel quality of measurement report cells in additional measurement results.

eNB can further define the maximum allowable cell number to be reported, the minimum threshold to be satisfied by allowable reported cell, the maximum allowable frequency to be reported, and the maximum allowable cell number to be reported by each frequency, etc. in measurement configuration to reduce signaling utilization.

It should be explained that the aforesaid explanation conducted during configuration of Pcell-related measurement by eNB 1 is also applicable to technical means required during configuration of Scell-related measurement by eNB 1. At this time, the cell meeting a certain condition included in measurement results refers to measurement target cell corresponding to other events A3-Scell (C3).

Specifically, the measurement configuration for multi-carrier system for the terminal by eNB 1 is explained below. To conduct moveable management and/or carrier management, eNB 1 uses RRC to connect re-configuration message to measure and configure the terminal. To report the additional measurement results, the measurement configuration for eNB is as follows:

Measurement object refers to f1, f2, f3 and f4;

Measurement ID refers to id1, id2, id3, id4, id5, id6, id7 and id8;

Report measurement refers to A2, A3-Pcell (A3), A3-Scell (C3), A5-Pcell (A5) and A4.

The association among measurement object, measurement ID and report configuration is shown in Table 1:

TABLE 1

| Measurement ID | Measurement object | Report configuration |
|---|---|---|
| id1 | f1 | A2 |
| id2 | f1 | A3-Pcell (A3) |
| id3 | f2 | A3-Pcell (A3) |
| id4 | f3 | A3-Pcell (A3) |
| id5 | f2 | A3-Scell (C3) |
| id6 | f3 | A3-Scell (C3) |
| id7 | f4 | A4 |
| id8 | f4 | A5-Pcell (A5) |

Meanwhile, eNB can carry the additional measurement results when UE is indicated to trigger measurement report of measurement ID (such as id2) during measurement configuration, for example, the indication carries measurement results corresponding to id3 and id4 during triggering of id2 measurement report, which refer to the cell in measurement report list corresponding to id3 and id4, or relates to id3 and id4. For the cell meeting only a certain condition, such as the one with channel quality on f2 and f3 exceeding a certain threshold, the one with best quality on f2 and f3 and so on, measurement results corresponding to id3 and id4 can be reported, and the aforesaid threshold can be configured through obvious measurement or informed to UE in the manner predetermined in the protocol. Ordinary technicians of the field shall understand that eNB can indicate UE to carry measurement results corresponding to id5, id6 and id7 when measurement report of id3 is reported during measurement configuration. The type of measurement results is not described here for it is the same as the one mentioned above.

The additional reporting identification in the embodiment (namely the identification of carrier measurement results in multi-carrier measurement results) can be measurement object, event or id.

If measurement object is taken as the identification of additional report, UE is indicated to trigger frequency f4-related measurement report during measurement configuration for eNB and carries corresponding measurement results at the same time, for example f2- and f3-related measurement results (frequency f2 and f3 or measurement id can be used for identification, such as measurement results corresponding to id5 and id6). The type of measurement results is not described here for it is the same as the one mentioned above.

If measurement event is taken as the identification of additional report, UE is indicated to trigger A3-Pcell (A3)-related measurement report during measurement configuration for eNB and carries measurement results of other frequencies at the same time (frequency f1, f2 and f2 or measurement id or measurement event A3-Scell can be used for identification, such as measurement results corresponding to id5 and id6). The type of measurement results is not described here for it is the same as the one mentioned above.

Moreover, eNB can indicate UE to add some restriction information of measurement report during measurement configuration, such as the maximum allowable cell number to be reported (for example, 4 cells), the minimum threshold to be satisfied by allowable reported cell, the maximum allowable frequency to be reported (for example, 2 frequencies), and the maximum allowable cell number to be reported by each frequency (for example, 1 cell), to reduce signaling utilization.

Embodiment III

Embodiment III of the present invention provides the measurement configuration and reporting method for multi-carrier system, which is applied in the condition as shown in FIG. 4 in Embodiment II. According to the pre-configured report strategy (for example, the pre-stipulated provisions in the protocol), after the network configures specific measurement event (such as A3-Pcell (A3)) for UE, UE shall carry the additional measurement results (which may exclude the cell on frequency without triggering this reporting) at the same time when measurement report is triggered by A3-Pcell (A3). These measurement results include the strongest cell on other measurement frequencies, the cell still in report list corresponding to other measurement id, measurement target cell corresponding to event A3-Scell (A3) or the cell with channel quality exceeding a certain threshold.

Said multi-carrier measurement results include one or some of the following options:

Measurement identification corresponding to additional measurement results;

Identifications of measurement report cells in additional measurement results;

Channel quality of measurement report cells in additional measurement results.

eNB can further add identification (such as 1 bit similar to on/off switch) during measurement configuration to indicate whether such additional measurement report is allowed, or add other identifications to indicate whether measurement results corresponding to these cells are carried during annex reporting. Similarly, it can also add other identifications for use with the pre-stipulated provisions together, for example the maximum allowable cell number to be reported is stipulated in the protocol, therefore, the identification in measurement configuration is used to indicate whether a certain additional report applies this restriction.

In detail, taking multi-carrier aggregation cell report during measurement report triggered by A3-Pcell (A3) as an example, in the embodiments of the present invention, it is pre-stipulated in the protocol that after the network configures measurement event A3-Pcell (A3) for UE, UE shall carry the additional measurement results (excluding the cell on frequency triggering this reporting) at the same time when measurement report is triggered by A3-Pcell (A3). This measurement result refers to the strongest cell on other measurement frequencies, and the maximum allowable cell number to be reported is 4.

When UE triggers measurement report owing to measurement event A3-Pcell (A3) corresponding to id2, it will carry the additional measurement results at the same time, namely the strongest cell on f2, f3 and f4, 3 in total. Furthermore, if UE is undesired to carry the additional measurement results when it triggers A3-Pcell (A3) reporting, 1 bit-identification can be additional during measurement configuration. When it is 0 bit, no additional measurement results are carried during reporting, while if it is 1 bit, additional measurement results will be carried during reporting. This identification can be associated with measurement id, measurement object or report configuration.

Embodiment IV

Figure 5:
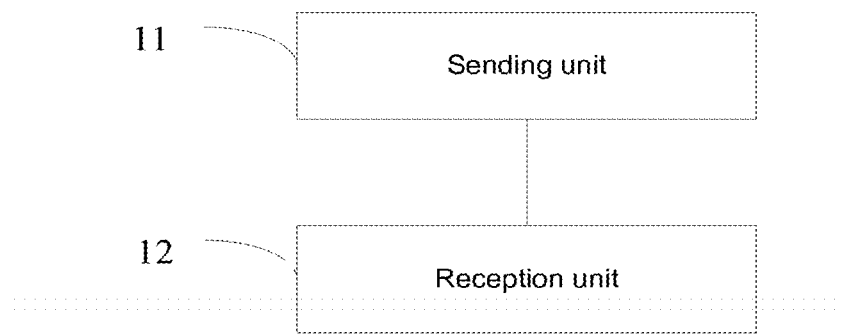
FIG. 5 is a structural diagram of the eNB provided in the embodiment IV of the present invention.

Founded on the same technological idea with embodiment of method aforesaid, Embodiment IV of the present invention provides an eNB as shown in FIG. 5, including:

Sending unit 11, which is used to send RRC signaling that carries multi-carrier measurement configuration information;

Reception unit 12, which is used to receive measurement report message that carries multi-carrier measurement results.

Said sending unit 11 is also used to: carry reporting indicator in said RRC signaling and indicate and report the identification information of measurement report corresponding to multi-carrier measurement results through said reporting indicator.

Said sending unit 11 is also used to: determine measurement object, event or ID to be reported corresponding to multi-carrier measurement results through said reporting indicator.

Meanwhile, said reporting indicator also carries the identifications of each carrier measurement results corresponding to said multi-carrier measurement results.

Multi-carrier measurement results received by the describe reception unit 12 included one or some of the following options:

The strongest cell on other measurement frequencies or the cells of configuration numbers from strong to weak in accordance with channel quality;

The strongest cell on other measurement frequencies in report list or the cells of configuration numbers from strong to weak in accordance with channel quality;

Those cells in the report list corresponding to other measurement identifications currently;

Measurement results corresponding to cells of configured measurement events, measurement objects, measurement identification, serving cells or measurement white list;

Cells with channel quality greater than preset threshold;

Cells capable of CA with those of currently triggered measurement report.

Multi-carrier measurement results received by the describe reception unit 12 included one or some of the following options:

Measurement identification corresponding to additional measurement results;

Identifications of measurement report cells in additional measurement results;

Channel quality of measurement report cells in additional measurement results.

Embodiment V

Figure 6:
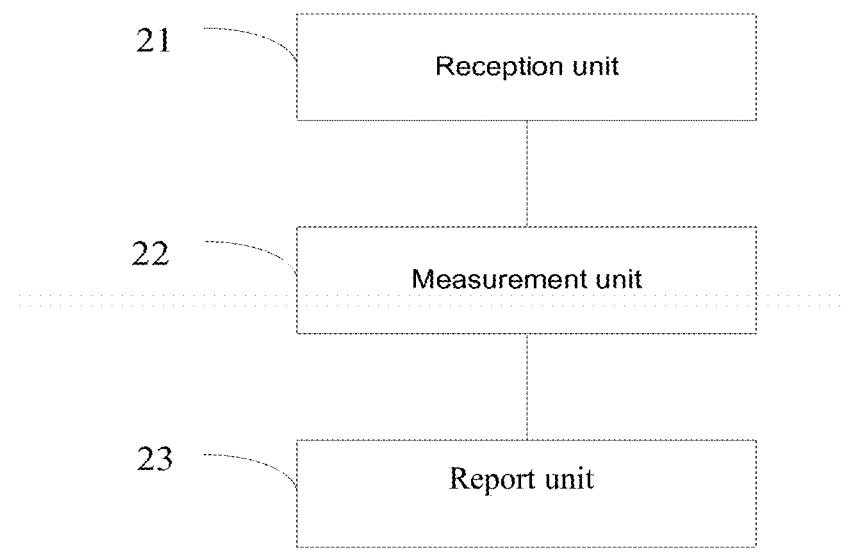
FIG. 6 is a structural diagram of the terminal provided in the embodiment V of the present invention.

Founded on the same technological idea with embodiment of method aforesaid, Embodiment V of the present invention provides a terminal as shown in FIG. 6, including:

Reception unit 21, which is used to receive RRC signaling sent by eNB;

Measurement unit 22, which is used to measure according to multi-carrier measurement configuration information carried in said RRC signaling;

Report unit 23, which is used to carry multi-carrier measurement results in measurement report message.

Said report unit 23 is also used to: acquire reporting indicator carried said RRC signaling; determine the identification information of measurement report corresponding to multi-carrier measurement results reporting through said reporting indicator, and carry such results in measurement report message corresponding to identification information of said measurement report.

Said report unit 23 is also used to:

Carry multi-carrier measurement results in measurement report message corresponding to said measurement ID when said measurement report identification refers to measurement identification ID;

Carry multi-carrier measurement results in measurement report message corresponding to said measurement event when said measurement report identification refers to measurement event;

Carry multi-carrier measurement results in measurement report message corresponding to said measurement object when said measurement report identification refers to measurement object.

Said report unit 23 is also used to:

Acquire the identifications of each carrier measurement results corresponding to said multi-carrier measurement results carried by said reporting indicator.

Said report unit 23 is also used to:

Determine the measurement report identification information corresponding to the reported multi-carrier measurement results according to the pre-configured report strategy, and carry multi-carrier measurement results in measurement report message corresponding to said measurement report identification.

Said report unit 23 is also used to:

Carry one or several options below in said multi-carrier measurement results:

The strongest cell on other measurement frequencies or the cells of configuration numbers from strong to weak in accordance with channel quality;

The strongest cell on other measurement frequencies in report list or the cells of configuration numbers from strong to weak in accordance with channel quality;

Those cells in the report list corresponding to other measurement identifications currently;

Measurement results corresponding to cells of configured measurement events, measurement objects, measurement identification, serving cells or measurement white list;

Cells with channel quality greater than preset threshold;

Cells capable of CA with those of currently triggered measurement report.

Said report unit 23 is also used to:

Carry one or several options below in said multi-carrier measurement results:

Measurement identification corresponding to additional measurement results;

Identifications of measurement report cells in additional measurement results;

Channel quality of measurement report cells in additional measurement results.

Said report unit 23 is also used to:

Carry multi-carrier measurement results in measurement report message according to one or several configurations below:

The maximum allowable cell number to be reported, the minimum threshold to be satisfied by allowable reported cell, the maximum allowable frequency to be reported, and the maximum allowable cell number to be reported by each frequency.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several instructions to enable a terminal unit (such as handset, personal computer, sever, or network equipment, etc.) to implement the methods described in all embodiments of the present invention.

Only the preferred embodiments of the present invention are mentioned above. It should be pointed out that technical personnel of the technical field can make any improvement and modification on the premise of respecting the invention principle, which also shall be protected by the present invention.

What is claimed is:

1. A measurement configuration and reporting method for multi-carrier system, the method comprising:
    sending, by an evolved Node-B (eNB), a radio resource control (RRC) signaling that carries multi-carrier measurement configuration information to a terminal;
    performing measurement, by the terminal in accordance with said multi-carrier measurement configuration information, and providing multi-carrier measurement results carried in a measurement report message,
    wherein said RRC signaling carries a reporting indicator; and the step of performing measurement, by the terminal, in accordance with said multi-carrier measurement configuration information and providing multi-carrier measurement results carried in the measurement report message, comprises:
    acquiring, by the terminal the reporting indicator carried in said RRC signaling,
    determining to report measurement report identification information corresponding to multi-carrier measurement results based on said reporting indicator, and
    providing the multi-carrier measurement results carried in a measurement report message corresponding to said measurement report identification information, according to one or more of the following configured options: the maximum number of cells allowable to be reported to, the maximum number of frequencies allowable to be reported at, and the maximum number of cells allowable to be reported to at each frequency.

2. The method as claimed in claim 1, wherein the step of providing the multi-carrier measurement results carried in the measurement report message corresponding to said measurement report identification information, comprises:
    when said measurement report identification information refers to measurement identifications (IDs), said terminal providing multi-carrier measurement results carried in a measurement report message corresponding to said measurement ID;

when said measurement report identification refers to a measurement event, said terminal providing multi-carrier measurement results carried in a measurement report message corresponding to said measurement event;

when said measurement report identification refers to a measurement object, said terminal providing multi-carrier measurement results carried in a measurement report message corresponding to said measurement object.

3. The method as claimed in claim 1, wherein said reporting indicator also carries identifications of each carrier measurement result corresponding to said multi-carrier measurement results.

4. The method as claimed in claim 1, wherein the step of providing the multi-carrier measurement results carried in the measurement report message comprises:

determining, by the terminal, measurement report identification information corresponding to to-be-reported multi-carrier measurement results according to a pre-configured report strategy, and providing the multi-carrier measurement results carried in a measurement report message corresponding to said measurement report identification information.

5. The method as claimed in claim 1, wherein said multi-carrier measurement results comprise one or more of the following options:

a strongest cell, or cells of configuration numbers from strong to weak, in accordance with channel qualities on other measurement frequencies;

a strongest cell, or cells of configuration numbers from strong to weak, in accordance with channel qualities on other measurement frequencies in a reporting list;

cells currently in a reporting list corresponding to other measurement identifications;

measurement results corresponding to configured measurement events, or measurement objects, or measurement identifications, or serving cells or cells in a measurement white list;

cells with channel qualities greater than a preset threshold;

cells capable of carrier aggregating (CA) with those currently triggering the measurement report.

6. The method as claimed in claim 1, wherein said multi-carrier measurement results comprise one or more of the following options:

measurement identifications corresponding to additional measurement results;

identifications of measurement report cells in additional measurement results;

channel quality of measurement report cells in additional measurement results.

7. An evolved Node-B (eNB), comprising:

a sending unit, which is configured to send a radio resource control (RRC) signaling that carries multi-carrier measurement configuration information; and a reception unit, which is configured to receive a measurement report message that carries multi-carrier measurement results, wherein said sending unit is also configured to: provide a reporting indicator carried in said RRC signaling, and indicate to report measurement report identification information corresponding to multi-carrier measurement results through said reporting indicator, and the multi-carrier measurement results carried in the measurement report message is provided according to one or more of the following configured options:

the maximum number of cells allowable to be reported to, the maximum number of frequencies allowable to be reported at, and the maximum number of cells allowable to be reported to at each frequency.

8. The eNB as claimed in claim 7, wherein said sending unit is also configured to:

determine to report measurement objects, measurement events or measurement identifications (IDs) corresponding to multi-carrier measurement results through said reporting indicator.

9. The eNB as claimed in claim 7, wherein said reporting indicator also carries identifications of each carrier measurement result corresponding to said multi-carrier measurement results.

10. The eNB as claimed in claim 7, wherein multi-carrier measurement results received by said reception unit comprises one or more of the following options:

a strongest cell, or cells of configuration numbers from strong to weak, in accordance with channel qualities on other measurement frequencies;

a strongest cell, or cells of configuration numbers from strong to weak, in accordance with channel qualities on other measurement frequencies in a reporting list;

cells currently in a reporting list corresponding to other measurement identifications;

measurement results corresponding to configured measurement events, or measurement objects, or measurement identifications, or serving cells or cells in a measurement white list;

cells with channel qualities greater than a preset threshold;

cells capable of carrier aggregating (CA) with those currently triggering the measurement report.

11. The eNB as claimed in claim 7, wherein the multi-carrier measurement results received by said reception unit comprise one or more of the following options:

measurement identifications corresponding to additional measurement results;

identifications of measurement report cells in additional measurement results;

channel quality of measurement report cells in additional measurement results.

12. A terminal, comprising:

a reception unit, which is configured to receive a radio resource control (RRC) signaling sent by an evolved Node-B (eNB);

a measurement unit, which is configured to perform measurement according to multi-carrier measurement configuration information carried in said RRC signaling;

a reporting unit, which is configured to provide multi-carrier measurement results carried in a measurement report message;

wherein said reporting unit is further configured to:

acquire a reporting indicator carried in said RRC signaling;

determine to report measurement report identification information corresponding to multi-carrier measurement results according to said reporting indicator, and provide such results carried in a measurement report message corresponding to the measurement report identification information, according to one or more of the following configured options: the maximum number of cells allowable to be reported to, the maximum number of frequencies allowable to be reported at, and the maximum number of cells allowable to be reported to at each frequency.

13. The terminal as claimed in claim 12, wherein said reporting unit is also configured to:
    provide multi-carrier measurement results carried in a measurement report message corresponding to measurement identifications (IDs) when said measurement report identification refers to measurement IDs;
    provide multi-carrier measurement results carried in a measurement report message corresponding to a measurement event when said measurement report identification refers to the measurement event;
    provide multi-carrier measurement results carried in a measurement report message corresponding to a measurement object when said measurement report identification refers to the measurement object.

14. The terminal as claimed in claim 12, wherein said reporting unit is also configured to:
    acquire identifications of each carrier measurement results corresponding to said multi-carrier measurement results carried by said reporting indicator.

15. The terminal as claimed in claim 12, wherein said reporting unit is also configured to:
    determine the measurement report identification information corresponding to to-be-reported multi-carrier measurement results according to a pre-configured report strategy, and providing the multi-carrier measurement results carried in a measurement report message corresponding to said measurement report identification information.

16. The terminal as claimed in claim 12, wherein said reporting unit is also configured to:
    provide one or several options below carried in said multi-carrier measurement results:
        a strongest cell, or the cells of configuration numbers from strong to weak, in accordance with channel qualities on other measurement frequencies;
        a strongest cell, or cells of configuration numbers from strong to weak, in accordance with channel qualities on other measurement frequencies in a reporting list;
        cells currently in a reporting list corresponding to other measurement identifications;
        measurement results corresponding to configured measurement events, or measurement objects, or measurement identifications, or serving cells or cells in a measurement white list;
        cells with channel qualities greater than a preset threshold;
        cells capable of carrier aggregating (CA) with those currently triggering the measurement report;
    or,
    provide one or several options below carried in said multi-carrier measurement results:
        measurement identifications corresponding to additional measurement results;
        identifications of measurement report cells in additional measurement results;
        channel quality of measurement report cells in additional measurement results.

\* \* \* \* \*